United States Patent [19]

Inuzuka et al.

[11] Patent Number: 4,889,766
[45] Date of Patent: Dec. 26, 1989

[54] PREPREG SHEET FOR FLAKE LINING AND LINING PROCESS USING THE SAME

[75] Inventors: Toshio Inuzuka; Tsutomu Hasegawa, both of Tsu; Minato Tomikawa; Shigeru Aoki, both of Yokohama, all of Japan

[73] Assignees: Nippon Glass Fiber Co., Ltd., Tsu; Chiyoda Corporation, Yokohama, both of Japan

[21] Appl. No.: 207,827

[22] Filed: Jun. 17, 1988

[30] Foreign Application Priority Data

Jun. 29, 1987 [JP] Japan ................. 62-159580

[51] Int. Cl.⁴ ............. B32B 5/16; B32B 19/00; B32B 17/00
[52] U.S. Cl. ................... 428/324; 428/325; 428/328
[58] Field of Search .............. 428/324, 325, 328

[56] References Cited

U.S. PATENT DOCUMENTS

| | | | |
|---|---|---|---|
| 3,158,528 | 11/1964 | Brown | 428/324 |
| 3,471,437 | 10/1969 | Hume | 428/325 |
| 4,042,559 | 8/1977 | Abelson et al. | 428/325 |
| 4,491,618 | 1/1985 | Kuwajima et al. | 428/324 |

FOREIGN PATENT DOCUMENTS

| | | | |
|---|---|---|---|
| 0008685 | 1/1979 | Japan | 428/324 |
| 0113681 | 9/1979 | Japan | 428/325 |
| 0079752 | 5/1984 | Japan | 428/325 |

OTHER PUBLICATIONS

Hearn, Ronald C., "Glassflake Reinforced Lining and Coatings", *Anti-Corrosion*, Aug. 1978, pp. 7-9.

*Primary Examiner*—Marion C. McCamish
*Assistant Examiner*—Nizar M. Ibrahim
*Attorney, Agent, or Firm*—Armstrong, Nikaido, Marmelstein, Kubovcik & Murray

[57] ABSTRACT

The present invention discloses a prepreg sheet for flake lining and a lining process using the same.

The prepreg sheet for flake lining according to the present invention comprises a sheet made of a matrix resin containing a curing agent and a thickening agent and flakes dispersed in the matrix resin in a state nearly parallel to the surface of the sheet.

The lining process using a prepreg sheet for flake lining according to the present invention comprises the following steps:

(1) a step of conditioning the surface of a substrate,
(2) a step of forming a primer layer on the conditioned surface,
(3) a step of bonding a prepreg sheet for flake lining comprising a sheet made of a matrix resin containing a thickening agent and a curing agent and flakes dispersed in the matrix resin in a state nearly parallel to the surface of the sheet onto the primer layer, and
(4) a step of curing the matrix resin of the prepreg sheet.

4 Claims, 2 Drawing Sheets

PREPREG SHEET FOR FLAKE LINING AND LINING PROCESS USING THE SAME

BACKGROUND OF THE INVENTION

The present invention relates to a prepreg sheet for flake lining and a lining process using the same.

It has already been known that flake lining characterized by using a compound comprising a matrix resin and thin flakes of, for example, glass dispersed therein is useful as corrosion-resistant lining for chemical equipment, storage facilities for petroleum, stack gas desulfurization facilities and the like. In such flake lining, flakes contained in the matrix resin act as a barrier to water vapor permeating the resin to prolong the passage of the water vapor physically. Thus, the flakes serve to enhance the resistance of the lining to corrosion and water vapor diffusion.

Up to this time, flake lining has been applied by troweling or spraying. However, the application of flake lining by troweling has disadvantages in that the application necessitates a skilled worker, that the applicability is so poor as to result in an increased number of steps and that the lining thickness is so nonuniform and large owing to the nature of the application method that the lining tends to cause crack or peeling. Further, in the flake lining to be applied by troweling, relatively large flakes having a diameter of 100 to 800 $\mu$ are generally used, so that a compound for the lining comprising a resin and such flakes is too viscous to be deaerated in the kneading thereof. Therefore, the resulting lining exhibits a wide scatter in performances disadvantageously.

On the other hand, the application of flake lining by spraying has also disadvantages in that a compound for the lining contains relatively small flakes having a diameter of 20 to 200 $\mu$, so that the resulting lining film exhibits a high water vapor permeability and that the lining thickness is nonuniform owing to the nature of the application method to result in lowered lining performances. Furthermore, it is impossible to enhance the flake content of the compound to be applied by spraying because the viscosity of the compound must be generally 50 Poise or below and therefore the flake content thereof must be generally 20 to 30%. Namely, such a compound containing flakes in an amount exceeding 30% is too viscous to be sprayed, so that the resulting lining exhibits an enhanced water vapor permeability.

Further, in the application of flake lining by spraying, the flakes dispersed in a matrix resin are blown by spraying against a substrate, so that it is difficult to arrange the flakes in a state nearly parallel to the substrate. Furthermore, the use of larger flakes is impossible because they cause clogging of a nozzle.

SUMMARY OF THE INVENTION

The present invention aims at overcoming the above disadvantages of the troweling and spraying according to the prior art.

Namely, an object of the present invention is to provide a prepreg sheet for flake lining wherein flakes having a widened range of diameter can be contained in a widened range of amount as compared with the compound for flake lining to be applied by troweling or spraying according to the prior art and a lining process using the same.

Another object of the present invention is to provide a prepreg sheet for flake lining which can be applied for a shortened application period of time to give a lining film exhibiting a reduced scatter of thickness and a lining process using the same.

The prepreg sheet of the present invention attaining the above objects comprises a sheet made of a matrix resin containing a thickening agent and a curing agent and flakes dispersed in the matrix resin in a state nearly parallel to the surface of the sheet.

The lining process of the present invention using the above prepreg sheet comprises:

(1) a step of surface preparation of a substrate, (2) a step of forming a primer layer on the prepared surface, (3) a step of bonding a prepreg sheet for flake lining comprising a sheet made of a matrix resin containing a thickening agent and a curing agent and flakes dispersed in the matrix resin in a state nearly parallel to the surface of the sheet onto the primer layer, and (4) a step of curing the matrix resin of the prepreg sheet.

PREFERRED EMBODIMENTS OF THE INVENTION

The matrix resin to be used in the prepreg sheet for flake lining and the lining process using the same, according to the present invention (hereinafter referred to as "the present invention"), includes various thermosetting and photo-setting resins such as unsaturated polyester resins made from isophthalic acid and bisphenol, vinyl ester resins, epoxy resins and epoxy acrylate resins.

The flake to be dispersed in the matrix resin includes glass flake, mica, metal flake, carbon flake and so on. These flakes are produced by crushing appropriate raw materials, for example, a thin glass plate in the case of glass flakes. Therefore, they are composed of irregular thin leaves having a thickness of 0.5 to 10 $\mu$, a size as determined on an assumption that they are in the form of a circular plate of 20 to 1000 $\mu$, and a large aspect ratio (diameter/thickness) of 4 to 1000. In the production of the prepreg sheet according to the present invention, it is preferred to use flakes having an aspect ratio as large as possible in such a range as not to cause any trouble.

According to the present invention, the amount of the flakes dispersed is generally 15 to 40%, preferably 25 to 35% of the total weight of the flake and the matrix resin. If the amount exceeds 40%, the flakes dispersed therein will come into contact with each other, so that the resistance to water vapor diffusion will not be enhanced with an increasing amount of the flakes and that the resulting mixture comprising a matrix resin and flakes will be so viscous that the mixture cannot easily be processed into a prepreg sheet. On the contrary, if the amount is less than 15%, the resulting lining will hardly be improved in the resistance to corrosion and water vapor diffusion to fail to attain its essential objects.

The thickness of the prepreg sheet containing flakes is generally 0.3 to 5 mm and may be suitably selected depending upon the required lining thickness.

According to the present invention, a curing agent such as a heat-curing agent or a photocuring agent and a thickening agent such as magnesium oxide (MgO) or isocyanate is further added to the matrix resin. Furthermore, various additives may be added to the matrix resin and examples of the additives include antioxidant, coloring agent, viscosity modifier and filler. The kind and amount of these additives may be selected in the light of, for example, those of the matrix resin for FRP according to the prior art.

The prepreg sheet of the present invention can be produced by a conventional sheet-molding compound method, a method of extruding a compound comprising a matrix resin and flakes through a slit or the like.

Figure 1:
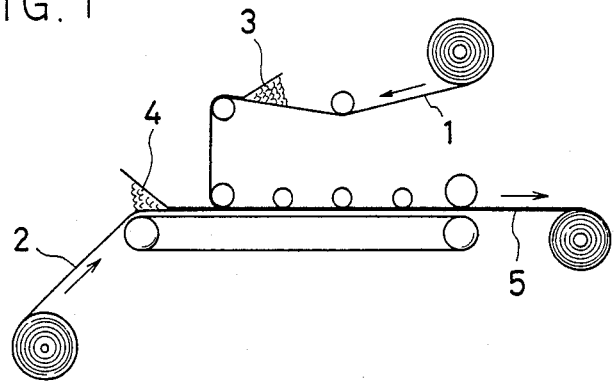
FIG. 1 shows an example of the production step of the prepreg sheet for flake lining according to the present invention.

For example, a prepreg sheet can be produced according to a sheet-molding compound method as shown in FIG. 1. First, a matrix resin is mixed with a predetermined amount of flakes to obtain a compound. This compound is applied to polyethylene films 1 and 2 with doctor knives 3 and 4 so as to give a constant thickness. The resulting composite films are united in such a way that the compound layers face each other.

Figure 2:
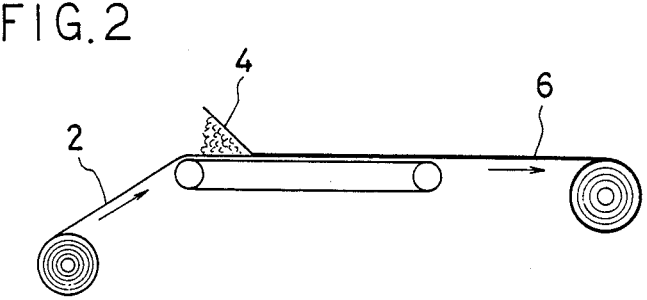
FIG. 2 shows another example thereof.

Alternatively, as shown in FIG. 2, a compound as described above may be applied only to one surface of a polyethylene film 2 with a doctor knife 4.

The resulting composite is deaerated, rolled up and aged to convert the matrix resin into a B-staged one. Thus, a rolled prepreg sheet 5, both surfaces of which are covered with polyethylene films, is obtained according to the process shown in FIG. 1, while a rolled prepreg sheet 6, one surface of which is covered with a polyethylene film, is obtained according to the process shown in FIG. 2.

Alternatively, the resulting composite may be deaerated and exposed to heat or light to convert the matrix resin into a B-staged one, followed by rolling up.

Figure 3:
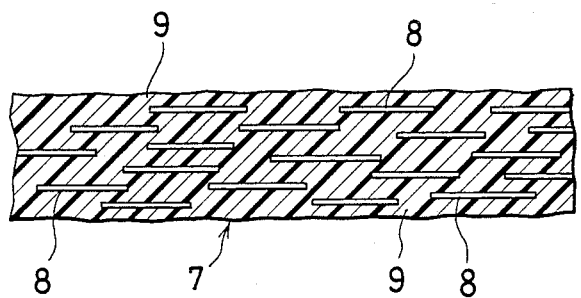
FIG. 3 is an enlarged partial sectional view of the prepreg sheet for flake lining according to the present invention.

As shown in FIG. 3, the obtained prepreg sheet 7 according to the present invention contains flakes 8 dispersed in the matrix resin 9 in a multi-layered state nearly parallel to the surface of the sheet. For example, when the amount of the flakes is 30% of the total weight of the flake and the matrix resin, about 50 layers of flakes are contained per mm of sheet thickness.

The flake to be used in the present invention has a large aspect ratio as described above, so that it can be dispersed in the matrix resin in a state nearly parallel to the surface of the sheet.

For example, in the case of producing the prepreg sheet for flake lining according to the present invention by the sheet-molding compound method, a gap is maintained between the doctor knife 3 and the film 1 (FIG. 1), and through the gap, the compound comprising a mixture of the matrix resin and glass flakes is supplied over the film 1. Depending on the viscosity of the compound, the head pressure due to the volume of the compound, the feed velocity of the film, the size of the gap and so on, the flow velocity of the resin coming out of the gap is not necessarily constant in directions parallel to the film, and in the flow of the resin there tends to be produced a flow velocity distribution, including a relatively rapidly flowing portion and a relatively slowly flowing portion of the resin. However, flakes have an area in the direction of their thickness and an area in the direction of their plane or the direction perpendicular to their thickness which considerably differ from each other, so that they tend to become arranged so as to reduce their resistance against the flow of the resin. Thus, even if a flow velocity distribution is generated as above, the flakes become dispersed in the matrix resin in a condition of being substantially parallel to the surface of the film.

Then, in the case of production of the prepreg sheet by extruding the compound through a slit, too, there tends to occur a flow velocity distribution in the flow of the resin. However, the flakes behave in a same way as above so as to reduce the resistance against the flow of the resin and become distributed in the resin, substantially parallel to the film.

The prepreg sheet of the present invention can be stored and transported in the form of a continuous roll as produced above. Alternatively, it may be cut into a desired size in due consideration of the convenience in the application thereof and stored and transported in the form of a pile of the cut sheets.

In the cases as described above, it is preferred to place a plastic film such as polyethylene, aluminized polyethylene, polyester, aluminized polyester or polyvinyl alcohol film between the prepreg sheets to prevent the adhesion of the sheets to each other.

For example, when producing a rolled prepreg sheet, the adhesion of the sheets to each other can be prevented by covering both surfaces of the sheet with films as shown in FIG. 1 or either surface thereof with a film as shown in FIG. 2. Thus, the working efficiency in the application of the prepreg sheet is enhanced, as will be described.

Further, a primer may be preliminarily applied to one surface of the prepreg sheet to thereby enhance the adhesion of the sheet to the surface of a substrate, by which the treatment of the surface of a substrate with a primer, which will be described below, can be dispensed with.

Alternatively, a self-adhesive or an adhesive may be preliminarily applied to one surface of the prepreg sheet instead of a primer, or a top coat may be preliminarily formed on one surface of the prepreg sheet.

Such a top coat can be formed by applying a mixture comprising a thermosetting and/or photosetting resin similar to the one used in the production of the prepreg (for example, unsaturated polyester resin, vinyl ester resin, epoxy resin or epoxy acrylate resin), a curing agent (such as methyl ethyl ketone peroxide) and a curing accelerator (such as cobalt naphthenate) to the surface of the prepreg sheet with a roller. Alternatively, a mixture as described above may be laid up on the surface of the prepreg sheet by using a nonwoven fabric such as glass surface mat or polyester mat to thereby form a relatively thick top coat. The formulation of the top coat and the method of forming the top coat layer may be in accordance with a conventional hand layup method of FRP.

Figure 4:
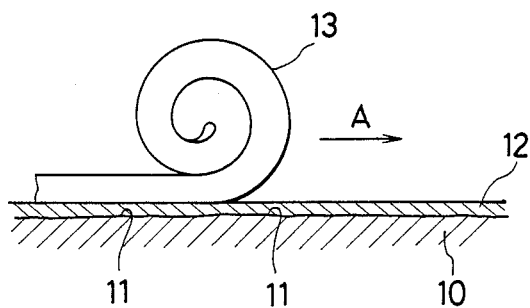
FIG. 4 is a schematic view of the lining process of the present invention.

Now, the lining process with the prepreg sheet according to the present invention will be described by referring to FIG. 4.

First, the surface of a substrate 10 to be lined, generally a metal surface, is ground to remove rust. In order to improve the adhesion of the prepreg to the substrate 10, the resulting substrate 10 is subjected to surface conditioning to form unevennesses 11 on the surface. The surface conditioning may be carried out by blasting such as sandblasting or grit blasting or chemical treatment, for example, pickling with chromic, sulfuric or nitric acid, etching with an alkali solution or phosphating.

Then, a primer is applied to the conditioned surface to form a primer layer 12. The thickness of the layer 12 is generally several tens to one hundred and several tens of $\mu$. The primer 12 is effective in preventing the conditioned surface from rusting and in keeping the adhesion between the substrate and the prepreg sheet on a high level. The formation of the primer is generally carried out by using a resin similar to the matrix resin of the prepreg sheet.

The prepreg sheet of the present invention is laid on the primer-treated surface, press bonded with, for example, a pressure roller and deaerated to cause intimate adhesion between the sheet and the surface. Then, the matrix resin is cured by heating or irradiation with light. The press bonding is carried out with a pressure of 3 to 10 kg/cm$^2$, while the curing by heating is generally carried out at a temperature of 60° to 120° C.

A rolled prepreg sheet as described above is applied as shown in FIG. 4 by putting a rolled prepreg sheet 13 on the primer layer 12 and moving the rolled sheet 13 in the direction of an arrow A, while peeling off the film from one surface of the prepreg sheet, when the both surfaces thereof are covered, or while bringing the uncovered surface of the prepreg sheet into contact with the primer layer 12, when one surface thereof is covered, thus spreading the sheet 13 over the primer layer 12.

This application method of spreading a rolled sheet in suit is advantageous from the standpoint of application efficiency.

Further, the prepreg sheet is press-bonded via the film covering it, so that the adhesion of a pressing device to the prepreg sheet can be inhibited.

When the film remains unpeeled after the press bonding, the film acts as a waterproof one, so that the heating for curing the lining can be carried out with steam or hot water. Further, even when the curing is carried out by irradiation with light, it is preferred that the lining covered with a film be cured as such, followed by the peeling of the film, because the adherence of dust to the lining during the curing can be advantageously inhibited thereby.

Figure 5:
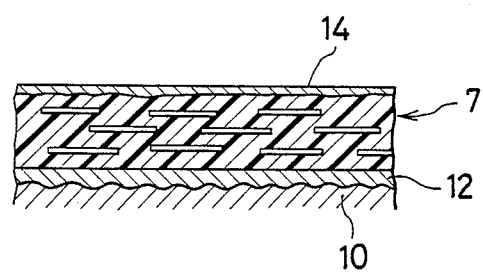
FIG. 5 is an enlarged partial sectional view showing an example of the lining applied according to the present invention.

After the curing of the prepreg and the peeling of the film, as shown in FIG. 5, a top coat 14 is applied to the surface of the prepreg sheet 7 by a similar method to the one described above and cured to further protect the lining film.

As described above, the prepreg sheet and the lining process with the same according to the present invention have the following advantages.

A. According to the lining process of the present invention, a preliminarily produced prepreg sheet having a thickness suitably selected in accordance with the object of application is applied to a substrate to be lined, so that the obtained lining film has a uniform thickness to thus overcome the disadvantage of poor uniformness of lining thickness according to the prior art.

B. According to the present invention, the diameter of the flakes to be dispersed in the matrix resin can be suitably selected, even including a larger diameter than that of the flakes used in the lining compound for troweling according to the present invention, and a prepreg sheet containing flakes having such a large diameter is particularly useful as heavy-duty corrosion-resistant lining for stack gas desulfurization facilities and so on.

C. According to the present invention, since a prepreg sheet is preliminarily produced, the flake content of the lining can be enhanced as compared with the lining applied by troweling or spraying according to the prior art, so that the resistance of the lining to corrosion and water vapor diffusion can be effectively improved.

D. In the prepreg sheet of the present invention, the flakes are dispersed in the matrix resin in a state nearly parallel to the surface of the sheet, so that the permeation of the water vapor through the lining is hindered by the flakes to prolong the passage of the water vapor. Thus, the lining according to the present invention can exhibit excellent resistance to corrosion and water vapor diffusion like the lining applied by troweling according to the prior art. Further, according to the present invention, a lining which is superior to the lining applied by troweling in resistance to corrosion and water vapor diffusion can be obtained by enhancing the aspect ratio of the flake or the flake content.

E. According to the lining process of the present invention, a lining can be formed only by contact-bonding a preliminarily produced prepreg to the surface of a substrate and curing the matrix resin. Therefore, the lining process does not necessitate any skilled workman unlike the process according to the prior art, so that it is possible to avoid influence due to difference among workmen in technical skill upon the resulting lining.

F. According to the present invention, a lining is formed only by applying a preliminarily produced prepreg sheet, so that the number of application steps can be remarkably reduced as compared with the process of the prior art.

Now, an Example of the lining process according to the present invention will be described.

EXAMPLE:

A vinyl ester resin compound containing 30% of Glass flakes having an average thickness of 5 $\mu$ (manufactured by Nippon Glass Fiber Co., Ltd., Tsu-shi, Mie-ken, Japan), based on the total weight of the Glass flake and the matrix resin, at least 80% of which had a diameter of 20 to 300 $\mu$, was processed into a prepreg sheet having a thickness of 2 mm, a width of 1 m and a length of 2 m.

On the other hand, a substrate was subjected to a surface conditioning by air blast, using alumina ($Al_2O_3$) as abrasive, at a pressure of 6.5 kg/cm$^2$, to obtain an average profile of 60 $\mu$m in $R_{max}$ and a cleanliness of SSPC-SP10, of the substrate surface.

Then, the blasted surface of the substrate was treated with a primer as follows. The primer was prepared by adding 1 part by weight of a curing agent to 100 parts by weight of a vinyl ester resin. On the substrate surface which was cleaned by an industrial vacuum cleaner, the primer was brush-coated and then left to spontaneously dry to obtain a thickness of the coated primer layer of 50 $\mu$m average. It took 3 hours before the coating of the primer was completed after the air blasting.

The above prepared prepreg sheet was then laid on the surface of the substrate treated with the primer as above, followed by a press-bonding and curing at 90° C.

From the cured flake lining prepreg sheet, the covering film was stripped and the surface of the cured prepreg sheet was abraded with a sand paper.

On the other hand, 0.2 parts by weight of cobalt naphthenate and 1 part by weight of methyl ethyl ketone peroxide were blended and stirred in 100 parts by weight of a vinyl ester resin to control the gelation time to 25 minutes (23° C). The resulting resin was used as a top coat resin and coated on the above abraded surface of the prepreg sheet, using a roller. Then, on the top coat layer, a nonwoven fabric of glassfiber was laminated and pressed by a roller to exude and defoam the top coat resin, which was then permitted to cure at room temperature. The above operated top coating of resin is a step commonly practiced in the production of FRP by a hand lay up method and requires no particular skill or skilled technique.

The above described lining process according to the present invention was found to bring about the following results.

(1) Lining rate

The lining rate per workman per day according to the present invention was about 15.6 m², while that of the troweling according to the prior art was 5 to 6 m²/man.day.

(2) Lining thickness

The thickness of the lining according to the present invention was nearly uniform and 2±0.4 mm.

On the other hand, the thickness of the lining formed by the troweling of the prior art was widely scattering and ranged from 1.5 to 3.5 mm, though the objective thickness was 2 mm.

We claim:

1. A prepreg sheet for flake lining, comprising a sheet made of a matrix resin containing a curing agent and a thickening agent and flakes dispersed in the matrix resin in a state nearly parallel to the surface of the sheet, said flakes being selected from the class consisting of glass flake, mica, metal flake and carbon flake, having a thickness of 0.5 to 10 $\mu$, a diameter of 20 to 1000 $\mu$, as determined on an assumption that the flakes are in the form of a circular plates, and an aspect ratio of 4 to 1000, and being dispersed in said matrix resin in an amount of 15 to 40% based on the total weight of the flakes and the matrix resin.

2. A prepreg sheet for flake lining as set forth in claim 1, wherein the thickness of the sheet made of a matrix resin is 0.3 to 5 mm.

3. A prepreg sheet for flake lining as set forth in claim 1, wherein said curing agent is one selected from the group consisting of heat-curing agents and photocuring agents.

4. A prepreg sheet for flake lining as set forth in claim 1, wherein said matrix resin is one selected from the group consisting of unsaturated polyester resins, vinyl ester resins, epoxy resins and epoxy acrylate resins.

* * * * *